US009024601B2

(12) United States Patent  (10) Patent No.: US 9,024,601 B2
Lu  (45) Date of Patent: May 5, 2015

(54) VOLTAGE CONVERTING APPARATUS WITH LOW POWER CONSUMPTION

(75) Inventor: Yung-Chen Lu, Hsinchu County (TW)

(73) Assignee: Excelliance MOS Corporation, Hsinchu County (TW)

( * ) Notice: Subject to any disclaimer, the term of this patent is extended or adjusted under 35 U.S.C. 154(b) by 215 days.

(21) Appl. No.: 13/615,674

(22) Filed: Sep. 14, 2012

(65) Prior Publication Data

US 2014/0028275 A1  Jan. 30, 2014

(30) Foreign Application Priority Data

Jul. 27, 2012  (TW) .............................. 101214644 U

(51) Int. Cl.
| | | |
|---|---|---|
| G05F 1/00 | (2006.01) | |
| G05F 1/565 | (2006.01) | |
| H02M 7/5387 | (2007.01) | |
| H02M 3/156 | (2006.01) | |
| H05B 33/08 | (2006.01) | |
| H02M 1/00 | (2006.01) | |

(52) U.S. Cl.
CPC ...... *H02M 3/156* (2013.01); *H02M 2001/0006* (2013.01); *H02M 2001/0025* (2013.01); *H02M 2001/0048* (2013.01); *Y02B 70/1491* (2013.01); *H05B 33/0818* (2013.01); *Y02B 20/346* (2013.01)

(58) Field of Classification Search
USPC ................. 323/266, 269, 272, 274, 275, 280, 323/282–287; 363/131, 132
See application file for complete search history.

(56) References Cited

U.S. PATENT DOCUMENTS

| | | | | |
|---|---|---|---|---|
| 4,849,651 | A | * | 7/1989 | Estes, Jr. ........................ 307/125 |
| 5,552,979 | A | * | 9/1996 | Gu et al. ........................... 363/98 |
| 5,677,619 | A | * | 10/1997 | Doluca .......................... 323/282 |
| 6,057,607 | A | * | 5/2000 | Rader et al. ..................... 307/11 |
| 6,160,389 | A | * | 12/2000 | Watts ............................. 323/282 |
| 6,522,113 | B1 | * | 2/2003 | Betten ........................... 323/282 |
| 7,872,428 | B1 | * | 1/2011 | Papanicolaou ................ 315/291 |
| 2004/0080965 | A1 | * | 4/2004 | Poon et al. ..................... 363/125 |
| 2006/0062026 | A1 | * | 3/2006 | Wittenbreder, Jr. ......... 363/21.06 |
| 2010/0194307 | A1 | * | 8/2010 | Nonaka et al. ................ 315/294 |
| 2011/0182090 | A1 | * | 7/2011 | Huang ............................ 363/26 |

* cited by examiner

*Primary Examiner* — Adolf Berhane
*Assistant Examiner* — Gary Nash
(74) *Attorney, Agent, or Firm* — Jianq Chyun IP Office

(57) ABSTRACT

A voltage converting apparatus is disclosed. The voltage converting apparatus includes a pulse width modulation (PWM) signal generating circuit, a power transistor, a first inductor, a second inductor and a feedback rectifier. The PWM signal generating circuit receives a feedback power to be an operating power and generates a PWM signal. A first terminal of the power transistor receives an input voltage, and a control terminal of the power transistor receives the PWM signal. The second inductor couples with a voltage on the first inductor and generates a coupling voltage. The feedback rectifier rectifies the coupling voltage to generate a feedback power.

9 Claims, 2 Drawing Sheets

VOLTAGE CONVERTING APPARATUS WITH LOW POWER CONSUMPTION

CROSS-REFERENCE TO RELATED APPLICATION

This application claims the priority benefit of Taiwan application serial no. 101214644, filed on Jul. 27, 2012. The entirety of the above-mentioned patent application is hereby incorporated by reference herein and made a part of this specification.

BACKGROUND

1. Technical Field

The invention relates to a power converting apparatus, and more particularly, to a buck-type and a buck-boost type power converting apparatus.

2. Related Art

Along with the progress of electronic technology, electronic products have become indispensable in our daily lives. In order for the electronic products to provide diverse functions, it has become the inevitable trend to supply a variety of electric powers for a plurality of application circuits to be utilized in the electronic products. While the most common method is, the required electronic power generated through a so-called voltage converter.

In general, most voltage converters require a pulse width modulation signal generating circuit to provide a pulse width modulation signal to drive a power transistor in the voltage converter, thereby executing the action of voltage converting. Under the consideration of green power, the conventional technique is usually employed the output voltage generated by the voltage converter to carry out the process, so as to be an auxiliary operating power of the pulse width modulation signal generating circuit. It should be noted that, while the voltage of the output voltage generated by the voltage converter and the voltage of the operating power of the pulse width modulation signal generating circuit have a certain difference, the action for generating the aforementioned auxiliary operating power requires more complicated circuit elements to implement, such that the cost of circuits is raised. Furthermore, there are also some technique difficulties on providing a stable operating power for the pulse width modulation signal generating circuit according to the output voltage generated by the voltage converter, which is also becoming an important topic for the designer in the field.

SUMMARY

The invention is directed to a voltage converting apparatus configured to provide a stable feedback power as an operating power of a pulse width modulation signal generating circuit.

The invention provides a voltage converting apparatus including a pulse width modulation signal generating circuit, a power transistor, a first inductor, a second inductor and a feedback rectifier. The pulse width modulation signal generating circuit receives a feedback power to be an operating power and generates a pulse width modulation signal. The power transistor has a first terminal, a second terminal and a control terminal, where the first terminal of the power transistor receives an input voltage, the control terminal of the power transistor is coupled to the pulse width modulation signal generating circuit to receive the pulse width modulation signal, and the second terminal of the power transistor is coupled to a first reference ground. The first inductor is serially connected between the first reference ground and a first output terminal of the voltage converting apparatus. A terminal of the second inductor is coupled to the first reference ground, and a second terminal of the second inductor couples with a voltage on the first inductor and generates a coupling voltage. The feedback rectifier is coupled between the second terminal of the second inductor and a terminal of the pulse width modulation signal generating circuit for receiving a feedback power, and rectifies the coupling voltage to generate the feedback power.

In an embodiment of the invention, the voltage converting apparatus further includes a first resistor, a first capacitor and a second capacitor. A first terminal of the first resistor receives the input voltage. A first terminal of the first capacitor and a second terminal of the first resistor are both coupled to the terminal of the pulse width modulation signal generating circuit for receiving the feedback power, and a second terminal of the first capacitor is coupled to the first reference ground. A first terminal of the second capacitor receives the input voltage, and a second terminal of the second capacitor is coupled to a second reference ground.

In an embodiment of the invention, the voltage converting apparatus further includes a second resistor. The second resistor is serially connected on a path of the second terminal of the power transistor coupling to the first reference ground.

In an embodiment of the invention, the voltage converting apparatus further includes a filter capacitor, a third resistor and a diode. The filter capacitor is serially connected between the first output terminal of the voltage converting apparatus and the second reference ground. The third capacitor is serially connected between the first output terminal of the voltage converting apparatus and the second reference ground. A cathode of the diode is coupled to the second terminal of the power transistor, and an anode of the diode is coupled to the second reference ground, wherein the second reference terminal is a second output terminal of the voltage converting apparatus, and a voltage on the first output terminal is greater than a voltage on the second output terminal.

In an embodiment of the invention, the voltage converting apparatus further includes a second resistor and a diode. A first terminal of the second resistor is coupled to the second terminal of the power transistor. A cathode of the diode is coupled to a second terminal of the second resistor, and an anode of the diode is coupled to the second output terminal of the voltage converting apparatus, wherein the first output terminal of the voltage converting apparatus is equal to the second reference ground, and a voltage on the first output terminal is greater than a voltage on the second output terminal.

In an embodiment of the invention, the voltage converting apparatus further includes a filter capacitor and a third resistor. The filter capacitor is serially connected between the second output terminal of the voltage converting apparatus and the second reference ground. The third capacitor is serially connected between the second output terminal of the voltage converting apparatus and the second reference ground.

In an embodiment of the invention, the feedback rectifier includes a first diode. An anode of the first diode is coupled to the second terminal of the second inductor, and a cathode of the first diode provides the feedback power.

In an embodiment of the invention, the feedback rectifier further includes a second diode and a resistor. The second diode is serially connected on a coupling path between the first diode and the second inductor. A cathode of the second diode is coupled to the second terminal of the second inductor, and an anode of the second diode is coupled to the anode of the first diode. The resistor is serially connected on a coupling path between the cathode of the first diode and the pulse width modulation signal generating circuit.

In an embodiment of the invention, the feedback rectifier rectifies the coupling voltage to generate the feedback power when the power transistor is cut off.

In an embodiment of the invention, the voltage converting apparatus further includes a feedback resistor. The feedback resistor is serially connected between the pulse width modulation signal generating circuit and the second terminal of the second inductor, wherein the pulse width modulation signal generating circuit detects the zero-current phenomenon of the first inductor through the feedback resistor.

According to the above descriptions, in the invention, through employing the second inductor to couple with the voltage on the first inductor of the voltage converting apparatus, and such voltage is rectified to generate the feedback power. The feedback power is provided into the pulse width modulation signal generating circuit, so as to be the auxiliary operating power of the pulse width modulation signal generating circuit. In this way, the stable feedback power may be provided into the voltage converting apparatus, such that the power consumption of the voltage converting apparatus may be further reduced. Moreover, under the state of the input voltage employing with different voltage levels, cooperating with the second inductor and the feedback rectifier may still generate a feedback power with an appropriate voltage level, so as to be the auxiliary operating power of the pulse width modulation signal generating circuit, thereby enhancing the applicable range of the voltage converting apparatus.

In order to make the features and advantages of the present invention more comprehensible, the present invention is further described in detail in the following with reference to the embodiments and the accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
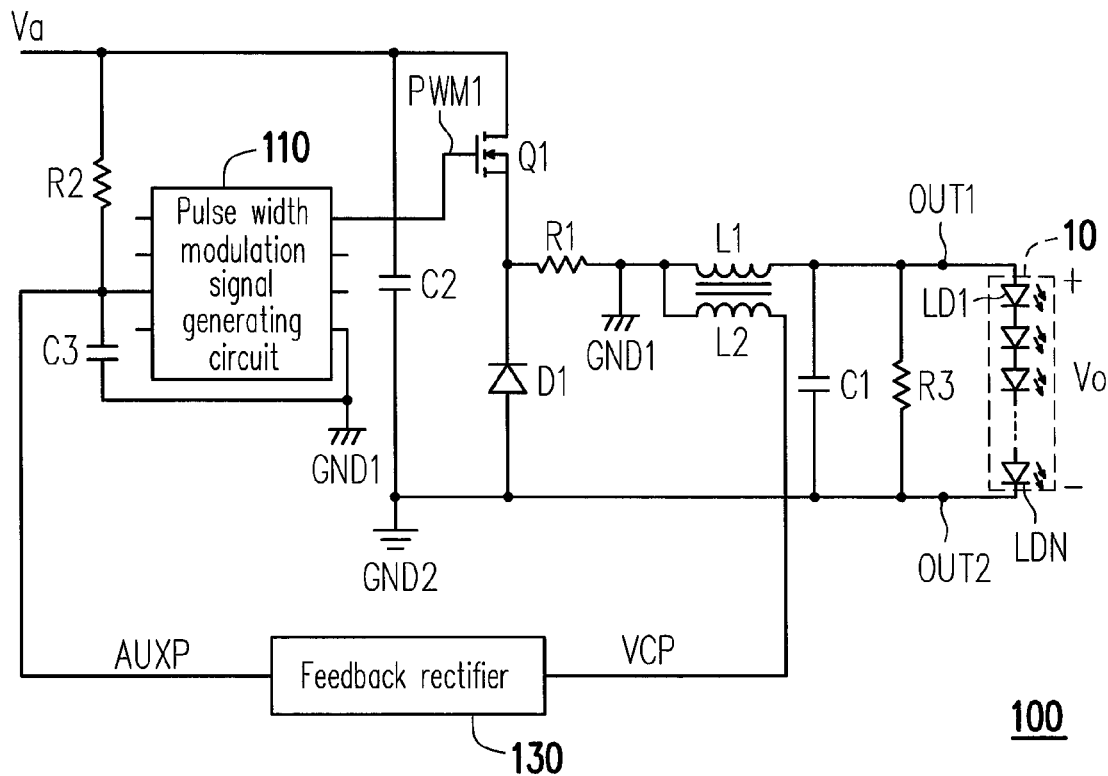
FIG. 1 is a schematic diagram illustrating a voltage converting apparatus 100 according to an embodiment of the invention.

FIG. 1 is a schematic diagram illustrating a voltage converting apparatus 100 according to an embodiment of the invention. Referring to FIG. 1, the voltage converting apparatus 100 includes a pulse width modulation signal generating circuit 110, a power transistor Q1, inductors L1, L2, a feedback rectifier 130, resistors R1~R3, a diode D1, a filter capacitor C1 and capacitors C2~C3. The voltage converting apparatus 100 is configured to drive a load 10. Wherein, in the embodiment, the load 10 is coupled between a first output terminal OUT1 and a second output terminal OUT2 of the voltage converting apparatus 100, and the load 10 are a plurality of light emitting diodes LD1~LDN serially connected. Wherein, a voltage on the first output terminal OUT1 is greater than a voltage on the second output terminal OUT2. Wherein, the voltage converting apparatus 100 is so-called a non-isolation voltage converting apparatus.

The pulse width modulation signal generating circuit 110 is configured to generate a pulse width modulation signal PWM1 and provides the pulse width modulation signal PWM1 to a control terminal of the power transistor Q1 (such as a gate of the power transistor Q1). The pulse width modulation signal generating circuit 110 is coupled to an input voltage Va through the resistor R2, and the input voltage Va provides the main operating power to the pulse width modulation signal generating circuit 110 on the coupling points of the resistor R2 and the capacitor C3 though a resistor-capacitor circuit formed by the resistor R2 and the capacitor C3. Moreover, the pulse width modulation signal generating circuit 110 also receives a feedback power AUXP provided by the feedback rectifier 130 through the coupling points of the resistor R2 and the capacitor C3, to be an auxiliary operating power.

It should be noted that, a terminal of the capacitor C3 is coupled to the resistor R2, and another terminal of the capacitor C3 is coupled to a first reference ground GND1. While the capacitor C2 is serially connected between the input voltage Va and a second reference ground GND2. Here, the first reference ground GND1 and the second reference ground GND2 are not identical, and the second reference ground of the embodiment is equal to the second output terminal OUT2 of the voltage converting apparatus 100.

A first terminal of the power transistor Q1 (such as a source of the power transistor Q1) receives the input voltage Va, and a second terminal of the power transistor Q1 (such as a drain of the power transistor Q1) is coupled to the first reference ground GND1 through the resistor R1. Furthermore, the diode D1 is inversely biased between the second terminal of the power transistor Q1 and the second reference ground GND2. Wherein, the current magnitude flowing through the light emitting diodes LD1~LDN may be adjusted through adjusting a resistance of the resistor R1.

The inductor L1 is serially connected between the first reference ground GND1 and the first output terminal OUT1 in order to cooperate with the turn-on and turn-off of the power transistor Q1, so as to convert a voltage. A terminal of the inductor L2 is coupled to the first reference ground GND1, and another terminal of the inductor L2 is coupled to the feedback rectifier 130. The inductor L2 is coupled with the inductor L1, and through coupling with a voltage on the inductor L1 to generate a coupling voltage VCP. Moreover, the filter capacitor C1 and the resistor R3 are serially connected between the first output terminal OUT1 of the voltage converting apparatus 100 and the second reference ground GND2. Wherein, the filter capacitor C1 is configured to filter out the noise of an output voltage V0 generated by the first output terminal OUT1 of the voltage converting apparatus 100.

In terms of the overall operation of the voltage converting apparatus 100, the voltage converting apparatus 100 is a buck-type voltage converting apparatus. When the power transistor Q1 is turned on according to the received pulse width modulation signal PWM1, the input voltage Va is passed through the turned-on power transistor Q1 and transmitted to the inductor L1. While the cross-voltage on the inductor L1 is about equal to the output voltage V0 subtracted from the input voltage Va. Here, the inductor L2 is simultaneously coupled with a voltage on the inductor L1 so as to generate the coupling voltage VCP that is transmitted to the feedback rectifier 130.

In contrast, when the power transistor Q1 is turned off according to the received pulse width modulation signal PWM1, the input voltage Va is passed through the first reference ground GND1 and transmitted to the inductor L1. While the cross-voltage on the inductor L1 is about equal to the output voltage V0. Concurrently, the inductor L2 is also coupled with a voltage on the inductor L1 so as to generate the coupling voltage VCP that is transmitted to the feedback rectifier 130.

It should be noted that, the feedback rectifier 130 only rectifies the coupling voltage VCP when the power transistor Q1 is turned off, so that the feedback power AUXP is generated. That is to say, when the power transistor Q1 is turned on, the feedback rectifier 130 may not generate the feedback power AUXP. In this way, the feedback rectifier 130 may provide the feedback power AUXP with a stable voltage.

In this embodiment, the voltage magnitude of the coupling voltage VCP may be set through setting the coil turns ratio of the inductor L1 to the inductor L2. That is to say, regardless of what the voltage magnitude of the output voltage V0 set-to-generate by the voltage converting apparatus 100 is, the designer may employ with an appropriate setting for the coil turns ratio of the inductor L1 to the inductor L2, so as to generate an applicable coupling voltage VCP. Certainly, the voltage magnitude of the feedback power AUXP may also be controlled effectively.

The following description may be described in more detail with two practical examples. Firstly, when the voltage of the output voltage V0 set-to-generate by the voltage converting apparatus 100 is equal to 3V and the required operating power from the pulse width modulation signal generating circuit 110 is 12V, the designer may set the coil turns ratio of the inductor L1 to the inductor L2 equal to 1:5. In this way, the feedback rectifier 130 may generate the feedback power AUXP (that is greater than 12V) to provide the pulse width modulation signal generating circuit 110 as the auxiliary operating power. Moreover, if the voltage of the output voltage V0 set-to-generate by the voltage converting apparatus 100 is equal to 100V and the required operating power from the pulse width modulation signal generating circuit 110 is 12V, the designer may set the coil turns ratio of the inductor L1 to the inductor L2 equal to 20:3. In this way, the feedback rectifier 130 may generate the feedback power AUXP (that is greater than 12V) to provide the pulse width modulation signal generating circuit 110 as the auxiliary operating power.

According to the above description, it should be understood that the embodiments of the invention may be a voltage converting apparatus for generating a variety of different output voltages, by only adjusting the coil turns ratio of the inductor L1 to the inductor L2.

In addition, the input voltage Va may be generated through a rectifier. The rectifier may receive an alternating current input voltage and carry out a full-wave rectification for the alternating current input voltage to generate the input voltage Va. Alternatively, the input voltage Va may also be provided through a power providing a direct current voltage such as a battery.

Figure 2:
FIG. 2 is a schematic diagram illustrating an implementation of a feedback rectifier 130 according to an embodiment of the invention.

FIG. 2 is a schematic diagram illustrating an implementation of a feedback rectifier 130 according to an embodiment of the invention. Referring to FIG. 2, the feedback rectifier 130 includes diodes ZD11, D11 and a resistor R11. The diode ZD11 is a zener diode, which has a cathode receiving the coupling voltage VCP and an anode coupled to an anode of the diode D11. Moreover, a cathode of the diode D11 is coupled to the resistor R11, while the resistor R1 generates a feedback power AUXP without coupling to a terminal of the diode D11.

It should be noted that, referring to FIG. 1 and FIG. 2 simultaneously, when the power transistor Q1 is turned on, the coupling voltage VCP is insufficient to turn on the diodes ZD11, D11 and blocked by the diodes ZD11, D11, such that the feedback rectifier 130 may not correspondingly generate the feedback power AUXP. In contrast, when the power transistor Q1 is turned off, the diode ZD11 may be considered as short-circuited and the diode D11 is turned on, and the feedback power AUXP is generated through the resistor R11 according to the coupling voltage VCP.

It should be mentioned that, under the circumstances of most economical circuit elements, the feedback rectifier 130 may only include the diode D11, so as to be implemented. The diode ZD11 and the resistor R11 are not necessary components.

Figure 3:
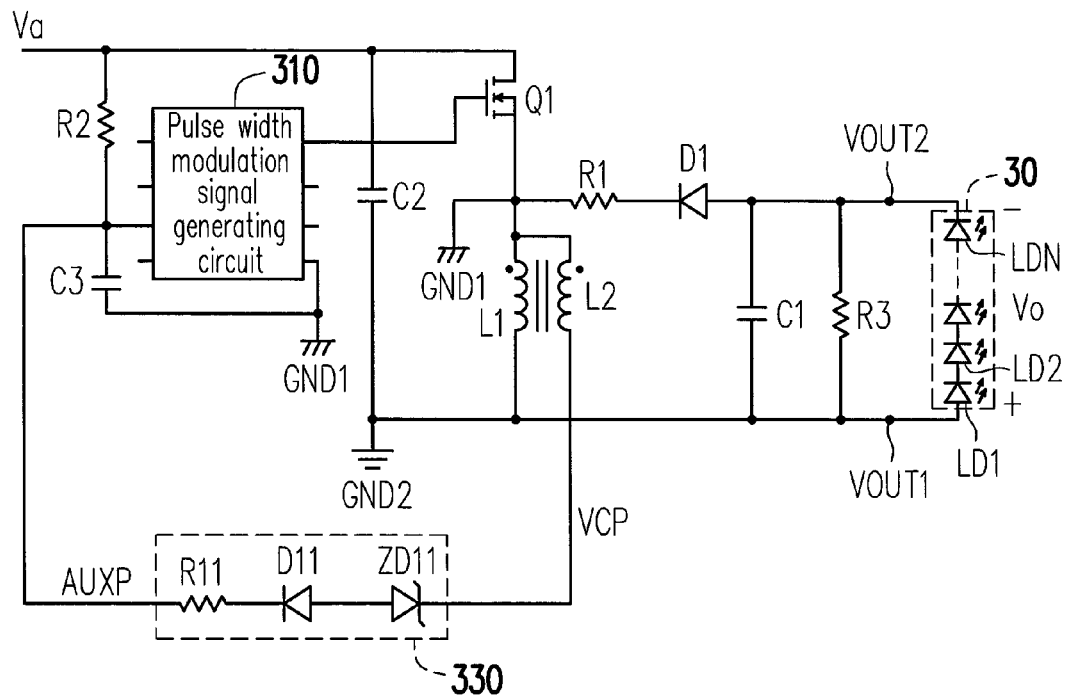
FIG. 3 is a schematic diagram illustrating a voltage converting apparatus 300 according to another embodiment of the invention.

FIG. 3 is a schematic diagram illustrating a voltage converting apparatus 300 according to another embodiment of the invention. Referring to FIG. 3, the voltage converting apparatus 300 of the embodiment is a buck-boost type voltage converting apparatus. A difference compared to the previous embodiment is that, the first output terminal OUT1 of the voltage converting apparatus 300 and the second reference ground GND2 are identical terminals in this embodiment, and thus a terminal of the inductor L1 is coupled to the first reference ground GND1 and another terminal of the inductor L1 is coupled to the second reference ground GND2 (equivalent to the first output terminal OUT1). While the resistor R1 and the diode D1 are sequentially and serially connected between the first reference ground GND1 and the second output terminal OUT2. It should be mentioned that, the load 30 constituted by the light emitting diodes LD1~LDN is forward biased between the first output terminal OUT1 and the second output terminal OUT2. That is to say, the voltage of the first output terminal OUT1 is greater than the voltage of the second output terminal OUT2.

An identity compared to the previous embodiment is that, in this embodiment, the inductor L2 is coupled with the voltage on the inductor L1 to generate the coupling voltage VCP, and the feedback power AUXP is generated through the feedback rectifier 330 when the power transistor Q1 is turned off, and the feedback power AUXP is provided into the pulse width modulation signal generating circuit 310, so as to be the auxiliary operating power of the pulse width modulation signal generating circuit 310.

Figure 4:
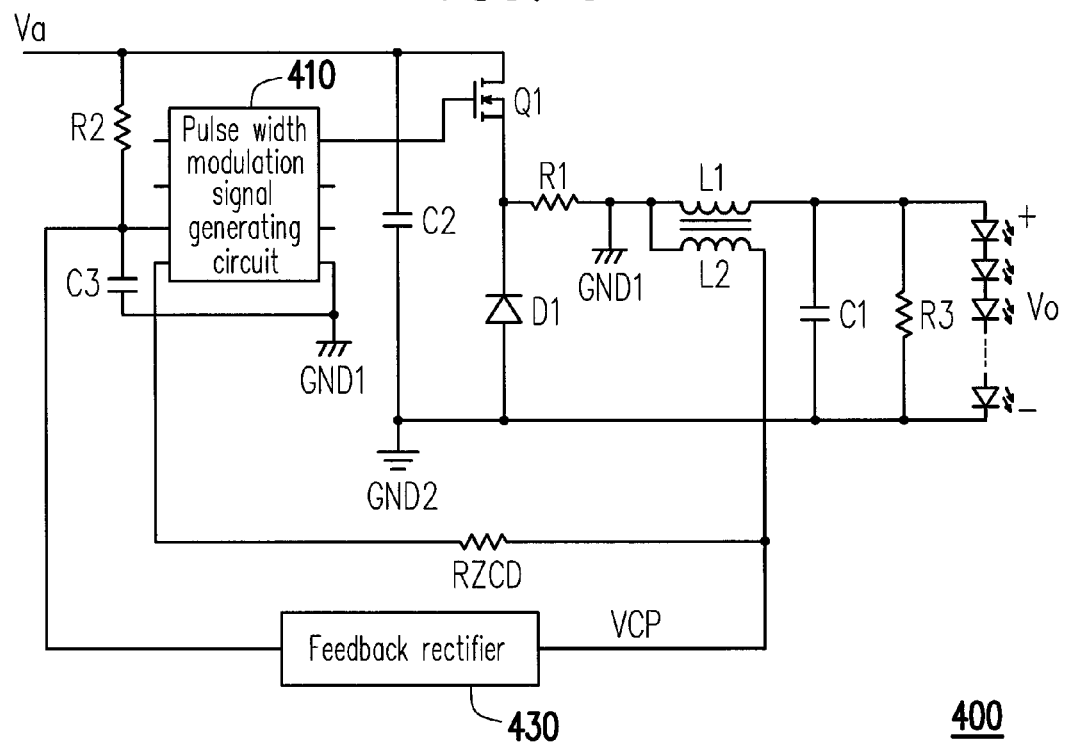
FIG. 4 is a schematic diagram illustrating a voltage converting apparatus 400 according to yet another embodiment of the invention.

FIG. 4 is a schematic diagram illustrating a voltage converting apparatus 400 according to yet another embodiment of the invention. Referring to FIG. 4, a difference compared to the embodiment illustrated in FIG. 1 is that, the voltage converting apparatus 400 of the embodiment further includes a feedback resistor RZCD. Wherein, the feedback resistor RZCD is serially connected between a terminal of the inductor L2 without coupling to the inductor L1 and the pulse width modulation signal generating circuit 410. The feedback resistor RZCD is configured to provide the pulse width modulation signal generating circuit 410 to detect a zero-current phenomenon on the first inductor L1.

It should be mentioned that, the pulse width modulation signal generating circuit 410 may determine the zero-current phenomenon on the first inductor L1 through the detected voltage variation on the feedback resistor RZCD. The operation details of the pulse width modulation signal generating circuit 410 detecting the zero-current phenomenon on the first inductor L1 are known by those skilled in the art, and therefore further elaboration thereof is omitted hereafter.

According to the above descriptions, in this invention, by disposing a plurality of inductors to couple with the voltage on the inductor of the voltage converting apparatus, so as to generate the coupling voltage, and when the power transistor is turned off, the coupling voltage is rectified to generate the feedback power, and the feedback power is provided into the pulse width modulation signal generating circuit, so as to be the auxiliary operating power of the pulse width modulation signal generating circuit. Accordingly, the power consumption of the voltage converting apparatus may be reduced effectively, thereby achieving the effect of power saving.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A voltage converting apparatus, comprising:
    a pulse width modulation signal generating circuit, receiving a feedback power to be an operating power and generating a pulse width modulation signal;
    a power transistor, having a first terminal, a second terminal and a control terminal, wherein the first terminal of the power transistor receives an input voltage, the control terminal of the power transistor is coupled to the pulse width modulation signal generating circuit and receives the pulse width modulation signal, and the second terminal of the power transistor is coupled to a first reference ground;
    a first inductor, serially connected between the first reference ground and a first output terminal of the voltage converting apparatus;
    a second inductor, having a terminal coupled to the first reference ground, and a second terminal of the second inductor coupling with a voltage on the first inductor and generating a coupling voltage;
    a feedback rectifier, coupled between the second terminal of the second inductor and a terminal of the pulse width modulation signal generating circuit for receiving the feedback power, and rectifying the coupling voltage to generate the feedback power; and
    a feedback resistor, serially connected between the pulse width modulation signal generating circuit and the second terminal of the second inductor,
    wherein the pulse width modulation signal generating circuit detects a zero-current phenomenon of the first inductor through the feedback resistor,
    wherein, the feedback power is used to be an auxiliary operating power of the pulse width modulation signal generating circuit.

2. The voltage converting apparatus as claimed in claim 1, further comprising:
    a first resistor, having a first terminal receiving the input voltage;
    a first capacitor, having a first terminal and a second terminal of the first resistor both coupled to the terminal of the pulse width modulation signal generating circuit for receiving the feedback power, and a second terminal of the first capacitor coupled to the first reference round; and
    a second capacitor, having a first terminal receiving the input voltage and a second terminal coupled to a second reference ground.

3. The voltage converting apparatus as claimed in claim 2, further comprising:
    a second resistor, serially connected on a path of the second terminal of the power transistor coupling to the first reference round.

4. The voltage converting apparatus as claimed in claim 3, further comprising:
    a filter capacitor, serially connected between the first output terminal of the voltage converting apparatus and the second reference ground;
    a third resistor, serially connected between the first output terminal of the voltage converting apparatus and the second reference ground; and
    a diode, having a cathode coupled to the second terminal of the power transistor and an anode coupled to the second reference ground,
    wherein the second reference ground is a second output terminal of the voltage converting apparatus, and a voltage on the first output terminal is greater than a voltage on the second output terminal.

5. The voltage converting apparatus as claimed in claim 2, further comprising:
    a second resistor, having a first terminal coupled to the second terminal of the power transistor; and
    a diode, having a cathode coupled to a second terminal of the second resistor and an anode coupled to a second output terminal of the voltage converting apparatus,
    wherein the first output terminal of the voltage converting apparatus is equal to the second reference ground, and a voltage on the first output terminal is greater than a voltage on the second output ten final.

6. The voltage converting apparatus as claimed in claim 5, further comprising:
    a filter capacitor, serially connected between the second output terminal of the voltage converting apparatus and the second reference ground; and
    a third resistor, serially connected between the second output terminal of the voltage converting apparatus and the second reference ground.

7. The voltage converting apparatus as claimed in claim 1, wherein the feedback rectifier comprises:
    a first diode, having an anode coupled to the second terminal of the second inductor, and a cathode of the first diode providing the feedback power.

8. The voltage converting apparatus as claimed in claim 7, wherein the feedback rectifier further comprises:
    a second diode, serially connected on a coupling path between the first diode and the second inductor, wherein a cathode of the second diode is coupled to the second terminal of the second inductor, and an anode of the second diode is coupled to the anode of the first diode; and
    a resistor, serially connected on a coupling path between the cathode of the first diode and the pulse width modulation signal generating circuit.

9. The voltage converting apparatus as claimed in claim 1, wherein the feedback rectifier rectifies the coupling voltage to generate the feedback power when the power transistor is cut off.

* * * * *